US007516158B2

(12) United States Patent
Drukman et al.

(10) Patent No.: US 7,516,158 B2
(45) Date of Patent: Apr. 7, 2009

(54) CUSTOMIZING WIDGET DRAW STYLES

(75) Inventors: Maxwell O. Drukman, San Francisco, CA (US); Karon A. Weber, San Francisco, CA (US); Robert Russ, Richmond, CA (US); Steven Hunter, San Francisco, CA (US); Tom Hahn, Piedmont, CA (US); Christopher Martin King, Berkeley, CA (US); Katrina Archer, Vancouver (CA)

(73) Assignee: Pixar, Emeryville, CA (US)

( * ) Notice: Subject to any disclaimer, the term of this patent is extended or adjusted under 35 U.S.C. 154(b) by 574 days.

(21) Appl. No.: 10/827,998

(22) Filed: Apr. 19, 2004

(65) Prior Publication Data
US 2005/0234884 A1    Oct. 20, 2005

(51) Int. Cl.
*G06F 17/30* (2006.01)
*G06F 7/00* (2006.01)
*G06F 15/16* (2006.01)
*G09G 5/02* (2006.01)

(52) U.S. Cl. ............... 707/104.1; 707/10; 707/3; 707/101; 707/102; 345/581; 709/204

(58) Field of Classification Search .............. 707/102, 707/3, 10; 345/581; 709/204
See application file for complete search history.

(56) References Cited
U.S. PATENT DOCUMENTS
5,793,368 A * 8/1998 Beer .................. 715/747
5,999,948 A * 12/1999 Nelson et al. ............ 715/506
6,529,215 B2    3/2003 Golovchinsky et al.
6,577,319 B1 * 6/2003 Kashiwagi et al. ........ 345/581
7,016,011 B2 * 3/2006 De Haan ................. 352/43
7,039,859 B1 * 5/2006 Sundaresan .............. 715/229
7,089,583 B2 * 8/2006 Mehra et al. ............. 726/3
2002/0083094 A1    6/2002 Golovchinsky et al.
2004/0090460 A1 * 5/2004 Kawahara ................ 345/764
2004/0128353 A1 * 7/2004 Goodman et al. ......... 709/204

OTHER PUBLICATIONS

Motif Programming Manual, vol. 6A, Chapters 1-3, 8 and 20, 2002, O'Reilly & Associates, Inc.*
"Notification Concerning Transmittal of International Preliminary Report on Patentability" dated Nov. 2, 2006, in International Application No. PCT/US2004/013156.
International Preliminary Report on Patentability, in International Application No. PCT/US2004/013156.
Written Opinion of the International Searching Authority, in International Application No. PCT/US2004/013156.

* cited by examiner

*Primary Examiner*—Kuen S Lu
(74) *Attorney, Agent, or Firm*—Townsend and Townsend and Crew LLP

(57) ABSTRACT

Techniques for customizing draw styles of widgets to better accommodate a user's direct manipulation needs. A user can customize various attributes of a widget and its manipulators to suit the user's needs. The customizations are stored as a style. The stored style can subsequently be applied to the widget to control the appearance and behavior of the widget. Stored styles may be applied to other widgets and can also be shared between users.

20 Claims, 11 Drawing Sheets

CUSTOMIZING WIDGET DRAW STYLES

BACKGROUND OF THE INVENTION

The present invention relates to computer animation and more particularly to techniques for customizing the appearance and behavior of widgets used for manipulating models and storing the customizations for later use.

Software systems or packages that enable manipulation of an object in a virtual 2-D or 3-D space generally provide a set of controls or "widgets" that enable a user of the package to carry out the manipulations. Such packages are used in various fields including computer aided design, computer animation, and the like. For example, most animation software packages provide a set of widgets that allow the user to directly transform (e.g., change position, scale, change orientation) computer generated image (CGI) models in virtual 3-D space.

Each widget may comprise one or more "manipulators" that allow the user to control model transformation. A user can "grab" a manipulator of a widget using a computer cursor and move the manipulator in a desired direction to affect the desired transform or manipulation of the model.

Conventionally, widgets and their manipulators are drawn in a way that indicates what transformations can be achieved by a user by using the widgets. Designers of the widgets generally rely on a fixed "language" of shape and color to indicate the range of use of each widget to the user. The standard widget designs are well-understood by some users, but less well-known by others. Additionally, the fixed nature of the design "language" means that widgets are generally designed to meet a single "best guess" requirement case.

For example, FIG. 1 depicts an arcball rotate widget 100 that may be used to transform an object. Widget 100 depicted in FIG. 1 comprises multiple manipulators 102, 104, 106, 108, 110, and 112 offering various degrees of transformation. Each manipulator is represented as a "steering wheel" style half-ring. A user can grab a manipulator and move it along the ring in the desired direction to achieve a desired transformation.

The widget design depicted in FIG. 1 may work well for manipulating a single object floating free in virtual space. However, conventional techniques of displaying widgets do not work adequately for complex models comprising multiple objects or multiple points of control that may be in close proximity. In such complex models, multiple widgets may need to be displayed concurrently to control each object and control point. In such situations, the minimum screen area necessary to draw the standard widgets at a reasonable size is generally greater than the space between the control points or objects. As a result, the widgets drawn using conventional techniques tend to overlap and/or occlude each other, leading to control confusion on part of the user, and eventually resulting in inoperability of the widgets.

Some software packages work around the above-mentioned problem by simply not allowing more than one widget to be displayed at a time. However, this drastically reduces the ability of the user to manipulate a model in an efficient manner. Thus, conventional techniques of drawing widgets fail to adequately provide solutions for drawing widgets concurrently in a manner that is usable.

BRIEF SUMMARY OF THE INVENTION

Embodiments of the present invention provide techniques for customizing draw styles of widgets to better accommodate a user's direct manipulation needs. A user can customize various attributes of a widget and its manipulators to suit the user's needs. The customizations are stored as a style. The stored style can subsequently be applied to the widget to control the appearance and behavior of the widget. Stored styles may be applied to other widgets and can also be shared between users.

According to an embodiment of the present invention, techniques are provided for storing information for a widget. In one embodiment, information is received identifying a first widget. A set of attributes associated with the first widget and values associated with the set of attributes are determined, the set of attributes comprising a first attribute having an associated first value. Input is received indicative of a change in the value associated with the first attribute from the first value to a second value distinct from the first value. Style information comprising information related to the set of attributes and their associated values is stored, wherein the style information comprises information associating the second value with the first attribute.

According to another embodiment of the present invention, techniques are provided for storing information for a widget associated with a model. In one embodiment, information identifying a model is received. A set of one or more widgets associated with the model is determined. The set of widgets includes a first widget. A set of one or more attributes for the first widget and values associated with the set of attributes are determined, the set of attributes comprising a first attribute having an associated first value. The first widget is displayed based upon the set of attributes and their associated values. A request to store information for the first widget is received. Information related to the set of attributes for the first widget and their associated values is stored responsive to the request.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
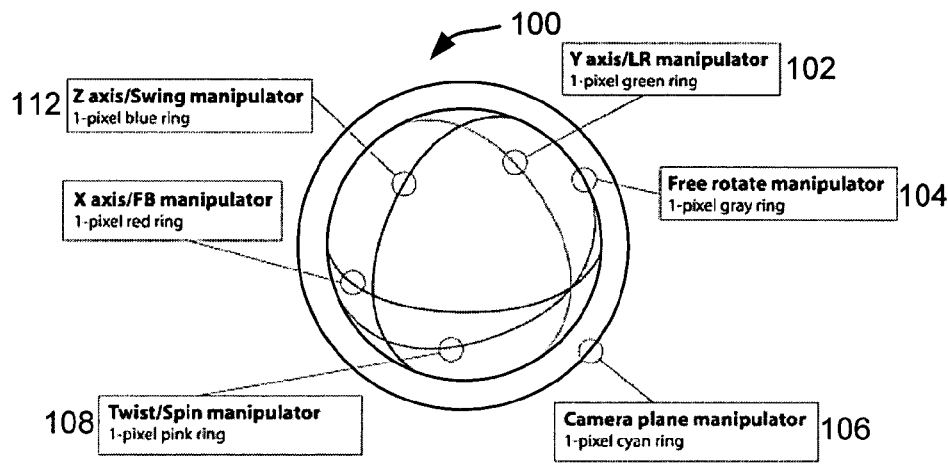
FIG. 1 depicts an example of a sample widget and its manipulators.

Embodiments of the present invention provide techniques for customizing draw styles of widgets to better accommodate a user's direct manipulation needs. As previously described, a widget is a set of controls that enables a user to transform/manipulate models in 2-D or 3-D virtual space. A model is generally a collection of geometric primitives used to describe the shape of an object. The object may have one or more control points that can be manipulated. Models may include articulated variables (avars) which can change value during modeling and animation. When an avar is changed, either interactively or via inbetweening in animation, aspects of the model which were defined either directly or indirectly using that avar are changed. A widget may comprise one or more manipulators. An example of a widget is depicted in FIG. 1. Widget 100 depicted in FIG. 1 is an arcball rotate widget comprising multiple manipulators 102, 104, 106, 108, 110, and 112 offering various degrees of transformation. Each manipulator is represented as a "steering wheel" style half-ring. A user can grab a manipulator and move it along the ring in the desired direction to achieve a desired transformation.

According to an embodiment of the present invention, a user may modify and customize the appearance and behavior of widgets and store the customized settings for subsequent use. According to an embodiment of the present invention, one or more attributes (or properties or features) are associated with each widget. The one or more attributes include attributes of manipulators of the widget. The values assigned to these attributes define the behavior and appearance of the widget. Embodiments of the present invention enable a user to customize or change the values that are assigned to attributes of a widget. In this manner, the user can customize the behavior and appearance of a widget according to the user's likes and needs. The user customizations for a widget may be stored as a style. A stored style can subsequently be applied to the widget or to other widgets to change their appearance and behavior per the applied style. Styles may also be shared with other users.

Figure 2:
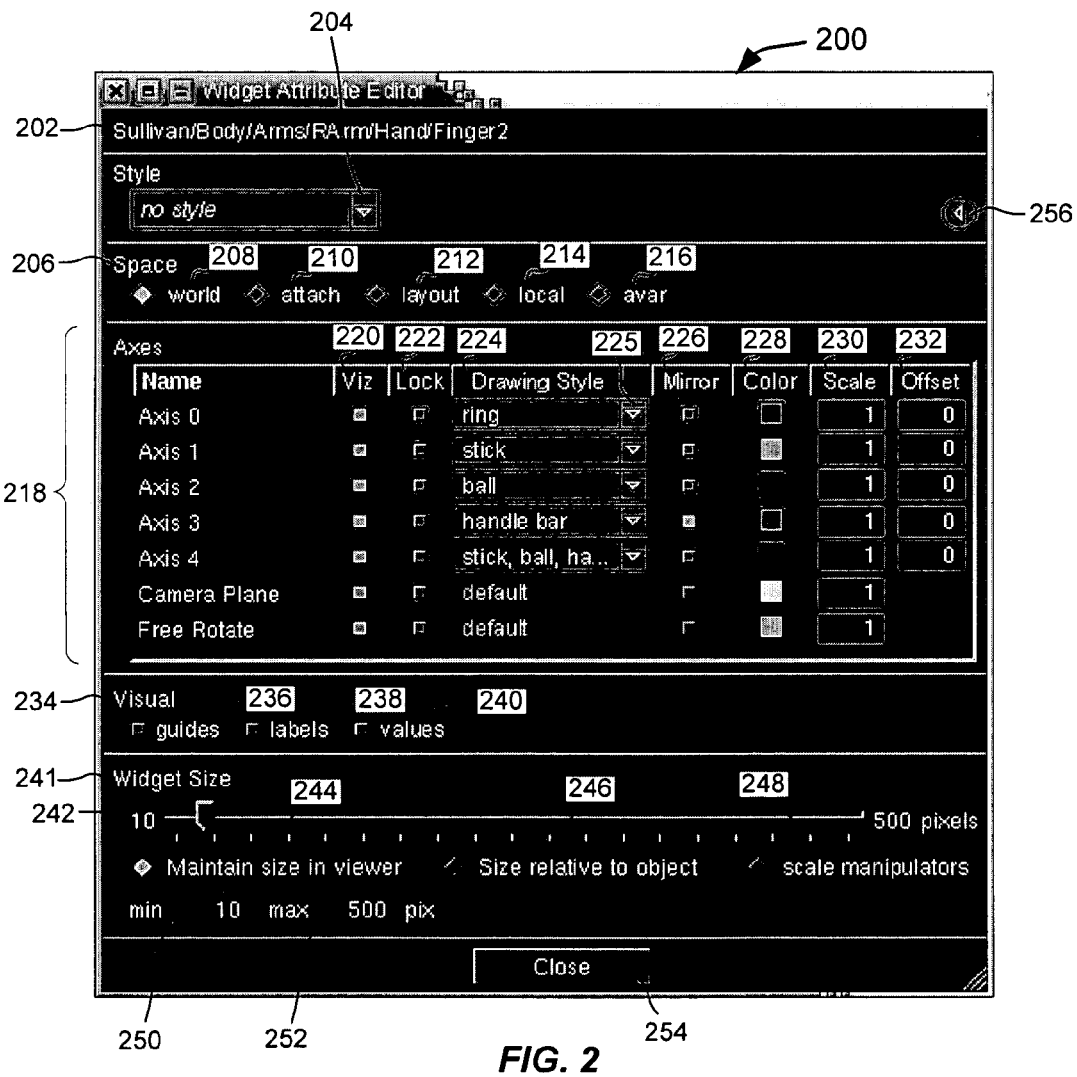
FIG. 2 depicts a simplified user interface that may be used to customize widget attributes according to an embodiment of the present invention.

According to an embodiment of the present invention, various user interfaces are provided that enable a user to customize widgets. These user interfaces allow a user to change values of attributes of a widget and to store the customized settings as a style. FIG. 2 depicts a simplified user interface 200 that may be used to customize widget attributes according to an embodiment of the present invention. GUI 200 enables a user to load and display a widget and its attributes information, apply styles to a widget, customize widget styles (i.e., change the values assigned to the widget attributes), save the custom settings, and other operations related to widgets and styles. It should be apparent that GUI 200 depicted in FIG. 2 is merely illustrative of an embodiment incorporating the present invention and does not limit the scope of the invention as recited in the claims. One of ordinary skill in the art would recognize other variations, modifications, and alternatives.

As depicted in FIG. 2, a name 202 of the widget is whose attributes information is loaded is displayed. Each widget is generally identified by a unique identifier and the unique identifier may be displayed as part of name 202. Name information 202 may also identify a location (e.g., a directory or folder) where the widget is stored.

A default style may be associated with each widget. The default style may include attributes and their values that have been set by the designer of the widget. This default style may then be customized by a user according to the teachings of the present invention. Accordingly, when a widget is loaded in GUI 200, information related to the default style may be loaded and displayed in user interface 200. Alternatively, if a customized style has been applied to the widget, then information regarding the customized style may be loaded and displayed in user interface 200. A user may then make changes to the attributes information displayed by GUI 200.

A default style may also be associated with a model. In this scenario, the default style associated with the model may be applied to all widgets associated with the model. The default style for the model may be configured by a modeler or model/tester or some other user. A default style for a model provides a convenient way for the modeler to provide a uniform look and feel for widgets associated with the model. The default model style may be customized by individual users.

According to an embodiment of the present invention, an object-oriented framework may be used for designing widgets. For example, a hierarchy of classes and objects may be used for designing widgets. A style may be associated with a particular class and is applied to all widgets that are instantiations of the particular class or are instantiations of classes that inherit from the particular class.

According to an embodiment of the present invention, a hierarchical approach may be used to determine a style to be associated with a widget. If a customized style has been associated with a widget then that customized style is applied. In absence of a customized style, the model style defined for the model with which the widget is associated may be applied to the widget. In absence of a customized or model style, the default style may be applied to the widget. If no default style has been configured, then the class style may be applied to the widget. When a style is applied to a widget, the appearance and/or behavior of the widget is controlled by the attributes included in the style and their associated values.

Accordingly, the information for a widget that is loaded and displayed by GUI 200 may represent information from a customized style, model style, default style, or class style.

Figure 3:
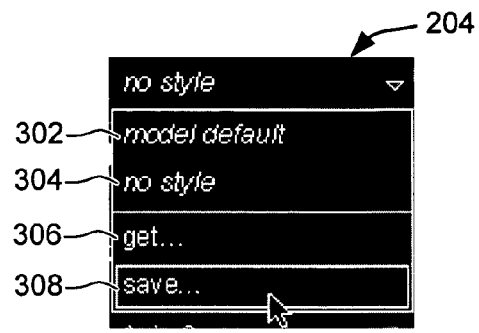
FIG. 3 depicts a pull-down menu for performing operations related to styles according to an embodiment of the present invention.

GUI 200 provides a pull-down menu 204 that enables the user to perform operations related to styles. The presently selected option is displayed in GUI 200. A detailed version of pull-down menu 204 according to an embodiment of the present invention is depicted in FIG. 3. As shown in FIG. 3, various user-selectable menu options are provided. A "model default" option 302 is provided which when selected by the user applies the default style associated with the model to the loaded widget. This option allows the user to revert back to a non-customized style state at any time. Other types of default options (e.g., default widget style, etc.) may also be provided. A "no style" option 304 is provided which when selected indicates that no specific style is configured and that the style defined for the class of which the widget is an instance is to be applied to the widget.

A "get . . . " option 306 is provided that enables the user to retrieve a previously saved style and apply it to the loaded widget. According to an embodiment of the present invention, a file browser window is displayed upon selecting "get . . . " option 306. The file browser window allows a user to navigate a directory or folder structure to select a style document desired by the user to be applied to the widget.

A "save . . . " option 308 is provided that enables the user to save the presently displayed attributes as a new style or alternatively overwrite a previously stored style. The style information may be stored in a document ("style document"). According to an embodiment of the present invention, a file browser window is displayed upon selecting "save . . . " option 308. The file browser window allows the user to select a location for storing the style and also for naming the style document. A "style" extension may be appended to the style filename to clearly identify it as a style file.

According to an embodiment of the present invention, permissions/privileges may be associated with the styles. In one embodiment, a user may be allowed to get and apply a style only if the user has the requisite access permissions/privileges for that style. A user may be allowed to update and/or store a style only if the user has the requisite permissions/privileges. In some embodiments, any user may get/apply a style, however the operations of saving a style or updating a style are restricted to users with the requisite permissions/privileges. In embodiments where operations that a user is allowed to perform are based upon the user's permissions/privileges, when a request is received from a user to save or modify a style, a check is first made to determine if the user making the request is permitted to perform the update or save operation. The user is allowed to perform the request operation only if it is determined that the user has the necessary permissions/privileges to perform the operation.

As depicted in FIG. 2, a space attribute 206 is provided for the widget that defines the space in which the widget operates. Spaces are used to set the orientation of the widget. Once oriented, manipulators of the widget perform their movements along axes specified by the space. Each widget can have its own knowledge of the spaces in which it can operate. The list of space choices may be built by the widget. Multiple user-selectable options (e.g., radio buttons in FIG. 2) are provided that enable a user to set a value for the space in which the widget operates.

As depicted in FIG. 2, the values that can be set for the space attribute include world 208, attach 210, layout 212, local 214, and avar 216. Widgets can also operate in various other spaces in alternative embodiments. If avar option 216 is selected, the widget can operate in the space of the avars to which it is mapped, which provides a one-to-one correlation between the mode's widget axis manipulators and avars.

Section 218 (labeled as "Axes" in FIG. 2) of GUI 200 lists the widget's manipulators and their attributes and value. A user can modify and customize the values of manipulator attributes. In the embodiment depicted in FIG. 2, the widget comprises seven manipulators, labeled "Axis 0", "Axis 1", "Axis 2", "Axis 3", "Axis 4", "Camera Plane", and "Free Rotate". The attributes information for the manipulators is displayed in a tabular format. The names of the manipulators may be affected by the space in which the widget operates. For example, when the widget operates in Avar space (or another named space that corresponds to Avar space), the axis manipulators of the widget may be labeled with their avar names (E.g., FB, LR, Swing) to indicate that the manipulators map to a specific avar. When the widget is not operating in avar-aligned space, then an axis manipulator may be labeled generically such as X, Y, Z, etc., to indicate that the manipulator is for movement along the axis of the chosen space (which may potentially affect more than one avar).

In the embodiment depicted in depicted in FIG. 2, the attributes for each manipulators include a visibility attribute (labeled "Viz") 220, a lock attribute 222, a drawing style attribute 224, a mirror attribute 226, a color attribute 228, a scale attribute 230, and an offset attribute 232. It should be apparent that other attributes may also be provided in other embodiments of the present invention.

Visibility attribute 220 is displayed as a toggle button in GUI 200 for each manipulator and allows the user to turn on or off the manipulator. Accordingly, when visibility attribute 220 is selected for a manipulator, that manipulator is rendered "invisible" or not displayed. This may be useful in situations where the complexity of the model or the positioning of a widget or its manipulators makes it difficult to use the widget manipulators. In such situations, one or more manipulators may be made "invisible" by setting the visibility attributes for the manipulators. Reducing the number of displayed manipulators may help improve the usability of the visible manipulators of the widget.

Lock attribute 222 is displayed as a toggle button in GUI 200 for each manipulator. Lock attribute can be set to on or off values. Selection of lock attribute 222 for a manipulator (i.e., setting the lock attribute to on) locks the function of the manipulator and prevents a user from performing a direct manipulation using the manipulator. According to an embodiment of the present invention, selection of lock attribute 222 locks the associated manipulator but not the avar. Accordingly, even when a manipulator is locked, a user can enter a value into that avar (e.g., by using a different manipulator).

A drawing style attribute 224 is provided for each manipulator. The drawing style attribute for a manipulator allows user to set a drawing style for the manipulator. As previously described, a default style may be applied to a widget. The default style for a widget may also specify a default style for the manipulators of a widget. For example, a basic Rotate widget may comprise six manipulators (X, Y, Z, Z2, Free, and camera plane) that are by default displayed as rings; a basic Translate widget may contain four manipulators (X, Y, Z, and planar), etc. In certain instances, the complexity of the model or the positioning of the widget may make it difficult to interact with the widget. For example, a user may find it cumbersome to work with standard six-ring rotates of a Rotate widget on the spine of a character. GUI 200 enables the user to change the default style values that are assigned to the drawing style attribute for each manipulator.

Figure 4:
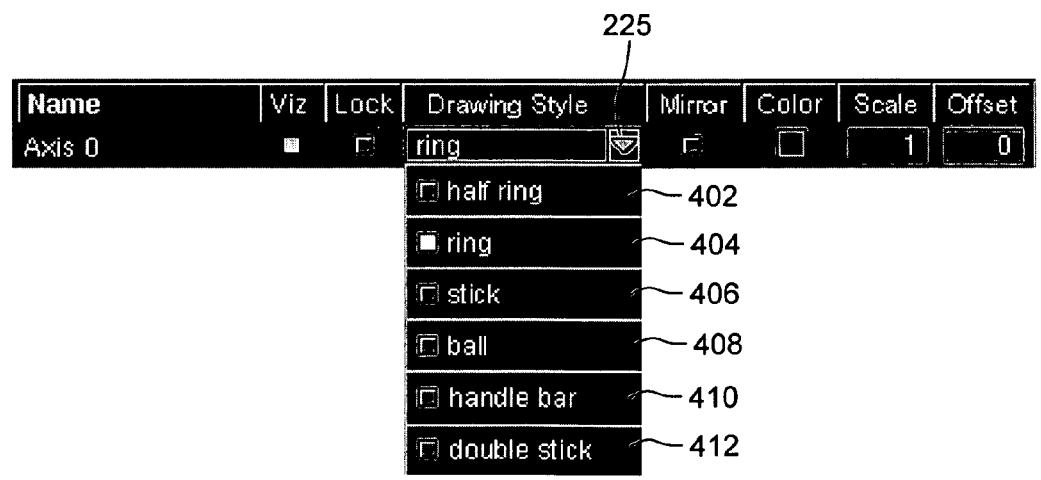
FIG. 4 depicts a pull-down menu for selecting drawing styles for manipulators according to an embodiment of the present invention.

The user can chose from multiple pre-defined drawing styles for each manipulator in a widget. A drop-down menu 225 is provided for each manipulator. According to an embodiment of the present invention, upon selection (e.g., by clicking) of drop-down menu 225 for a manipulator, a list of available manipulator styles are displayed as depicted in FIG. 4. The user-selectable style options depicted in FIG. 4 include half ring 402, ring 404, stick 406, ball 408, handle bar 410, and double stick 412. Several other options may be provided in other embodiments of the present invention. These options may be predefined by the widget designer, modeler, or may even be created by the user. The user can select an option by clicking on it and the selected option is then assigned as the value for the draw style attribute 224 for a manipulator. The user-selected option is then displayed next to the widget in GUI 200, as depicted in FIG. 2. The draw style associated with a manipulator is then used to control the appearance and behavior of the manipulator when the manipulator is displayed.

Selecting a particular style for a manipulator changes the visual representation of the manipulator, but the manipulator operation remains the same. Each manipulator can be drawn as a single style, or as combinations of draw styles. Manipulator drawing styles can be combined to create customized manipulator visual representations. These are useful in providing specialized visual feedback to assist the user. Examples of various styles including combination of style that can be defined and applied to various manipulators are described below.

A mirror attribute 226 is provided for each manipulator as a toggle button. The mirror attribute for a manipulator can be set to either on or off. When mirror attribute 226 is selected (i.e., set to on) for a manipulator, a duplicate manipulator is drawn at the polar opposite location from the original manipulator. This function is useful when the manipulator also has an offset value. For example, if the offset value is set to zero, then the mirror location is also zero. If the offset value is 1400, the mirror location is at −1400.

Figure 5:
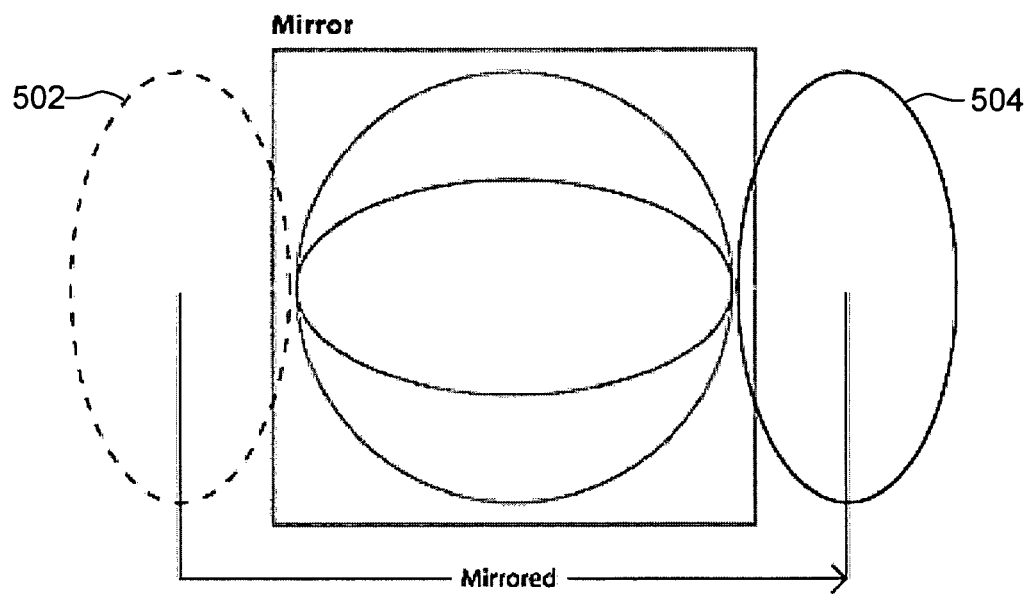
FIG. 5 depicts the effects of a mirror attribute on the position of a ring rotate manipulator according to an embodiment of the present invention.

FIG. 5 depicts the effects of a mirror attribute on the position of a ring rotate manipulator according to an embodiment of the present invention. Dotted line 502 represents the original default position of the ring manipulator. Line 504 depicts the position of the ring manipulator with the mirror attribute selected (i.e., set to on) and having an offset value set. As depicted, a mirror manipulator is drawn at the polar opposite location from the original manipulator position.

A color attribute 228 is provided for each manipulator and allows the user to set the draw color for each manipulator. Clicking on the color attribute for a manipulator invokes a user interface (e.g., a drop-down menu with color options, a color palette, etc.) that allows a user to choose a color to be assigned to the color attribute for the manipulator. The user-selected color is then displayed in GUI 200 depicted in FIG. 2. The color attribute value for a manipulator determines that color that is used to display the manipulator when the widget is displayed.

A scale attribute 230 is provided for each manipulator that allows the user to define a value for scaling the manipulator in relation to other manipulators. According to an embodiment of the present invention, a default scale value of 1 (i.e., 100%) is set for each manipulator. The user can change the scale value for a manipulator by entering another value. According to an embodiment of the present invention, the permissible range of scale values is 0.1 (10%) to 5 (500%). Various other values may also be possible in alternative embodiments.

Figure 6:
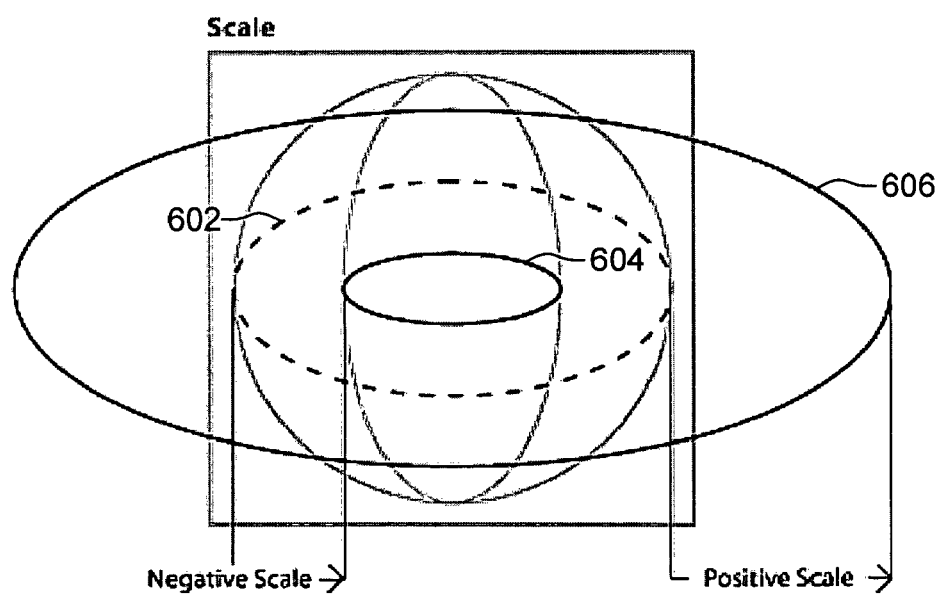
FIG. 6 depicts the effects of a scale attribute on the position of a rotate ring manipulator according to an embodiment of the present invention.

FIG. 6 depicts the effects of a scale attribute on the position of a rotate ring manipulator according to an embodiment of the present invention. Dotted line 602 represents a ring manipulator with a scale attribute of 1. Line 604 represents the position of a scaled-down version of the ring manipulator when the scale attribute is set to a value less than 1. Line 606 represents the position a scaled-up version of the ring manipulator when the scale attribute is set to a value greater than 1.

An offset attribute 232 is provided for each manipulator. The value of offset attribute 232 for a manipulator offsets the manipulator along its axis to move it away from other manipulators. According to an embodiment of the present invention, a default value of zero (i.e., no offset) is set for each manipulator. A user can change and customize the default values for each manipulator. In one embodiment, the permissible range of values for the offset attribute is between −5 (negative offset equal to 500 percent of outer diameter) and +5 (positive offset equal to 500 percent of outer diameter).

Figure 7:
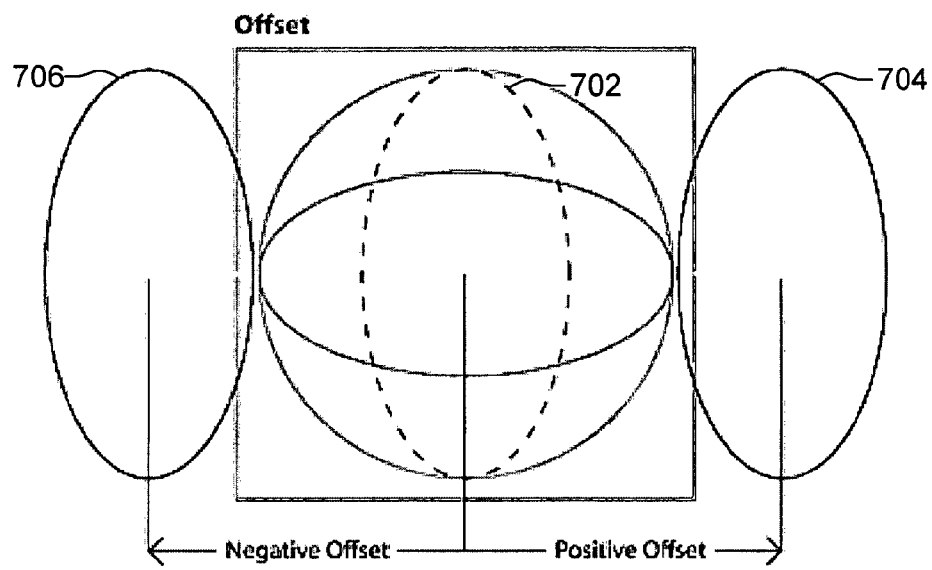
FIG. 7 depicts the effects of offset attribute on the position of a rotate ring manipulator according to an embodiment of the present invention.

FIG. 7 depicts the effects of offset attribute 232 on the position of a rotate ring manipulator according to an embodiment of the present invention. Dotted line 702 represents a ring manipulator with a default zero offset. Line 704 represents the position of an offset ring manipulator when the offset attribute is set to some positive offset value. Line 706 represents the position of an offset ring manipulator when the offset attribute is set to some negative offset value.

A visual style attribute 234 is provided for a widget. GUI 200 depicted in FIG. 2 provides user-selectable toggle check boxes for setting visual styles for a widget. As depicted in FIG. 2, several visual style options are provided including a guides toggle option 236, a labels toggle option 238, and a values toggle option 240. A user may toggle the visual display of widget guides on or off using guides toggle option 236. A widget guide is a geometry that is drawn along with a widget to provide the user a higher degree of visual feedback. Widget guides generally cannot be manipulated like manipulators.

The visual display of labels associated with a widget may be turned on or off using labels toggle option 238. Labels are generally textual names that are associated with manipulators of a widget. For example, labels may be used to label the axes of a widget, etc.

The visual display of manipulator values readout may be turned on or off using value toggle option 240. Readouts are a type of tool tip that provides heads-up avar value and avar delta amounts in a viewer. A readout box may comprise a label, current avar value. avar delta amount (amount of current movement) of each affected manipulator, in that manipulator's color.

GUI 200 also provides user-selectable options for setting the size 241 of the widget. In the embodiment depicted in FIG. 2, a widget size slider 242 is provided that can be manipulated by the user to change the size of the widget. In FIG. 2, the range of sizing is 10 pixels minimum to 500 pixels maximum. The size of a widget can be clamped to specified pixel amounts by setting values for Min 250 and Max 252.

User-selectable options are also provided for customizing the behavior of the widget in response to operations such as a resize, zoom, etc. A "maintain size in viewer" option 244 is provided which when selected maintains the size of the widget at its defined pixel size regardless of the viewer zoom action. A "size relative to object" option 246 is provided which when selected scales a widget to match relative size to the model. A "scale manipulators" option 248 is provided which can be used for scale widgets. Scale manipulators option 248 checkbox toggles widget manipulator behavior so that manipulators remain in place when the mouse is releases, rather than having them snap back to the default location.

A "Close" button 254 is provided for closing GUI 200.

Figure 8:
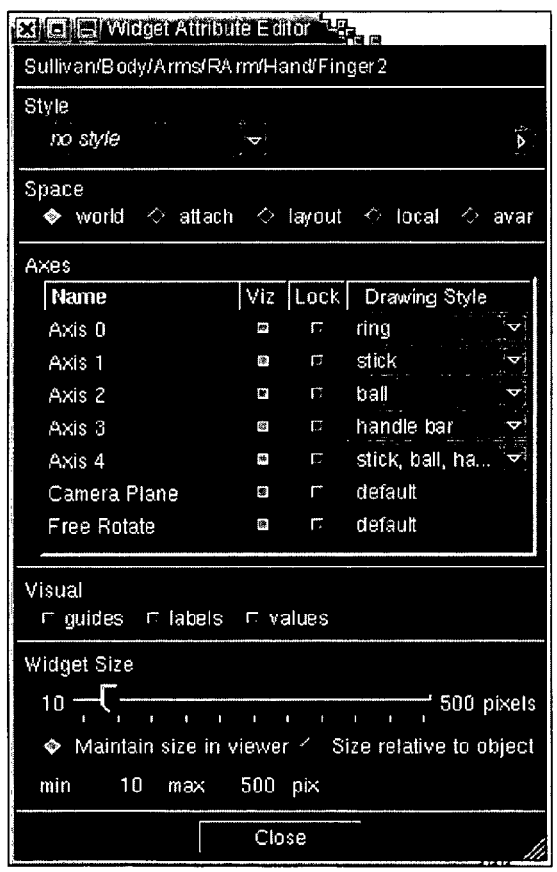
FIG. 8 depicts a GUI displayed in basic mode according to an embodiment of the present invention.

According to an embodiment of the present invention, different modes may be used for displaying GUI 200. For example, in one embodiment, GUI 200 may be displayed in a basic mode and an advanced mode. In such an embodiment, a button 256 may be provided for switching between the advanced mode display and the basic mode display. According to an embodiment of the present invention, GUI 200 depicted in FIG. 2 represents the advanced mode display. When the GUI is displayed in advanced mode, then the basic mode display may be displayed by clicking button 256. Alternatively, when the GUI is displayed in basic mode, then the advanced mode display may be displayed by clicking button 256. An example of a basic mode display according to an embodiment of the present invention is depicted in FIG. 8. GUI 200 (basic mode) depicted in FIG. 8 comprises fewer user-selectable attribute options than GUI 200 (advanced mode) depicted in FIG. 2.

Figure 9A:
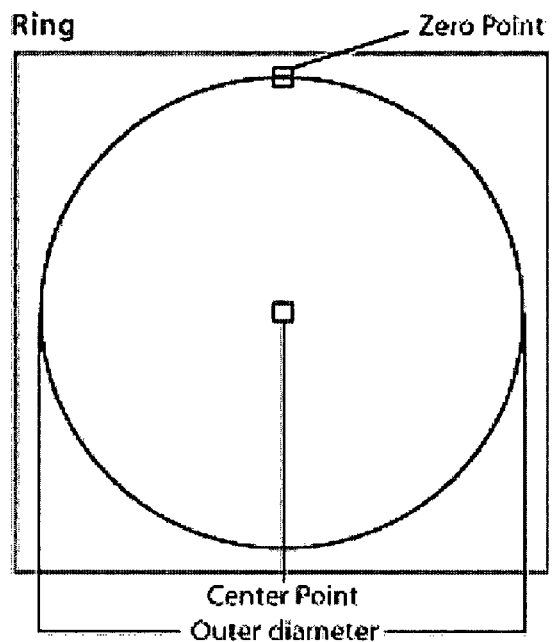
FIG. 9A depicts a basic rotate manipulator drawn as a ring according to an embodiment of the present invention.
Figure 9B:
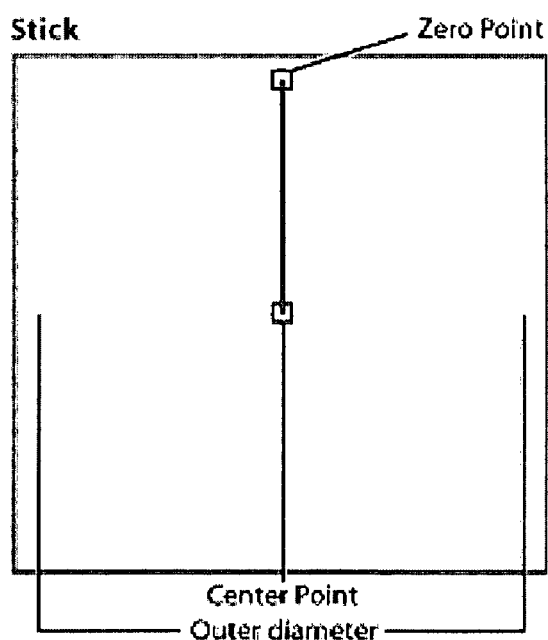
FIG. 9B depicts a rotate manipulator drawn as a stick according to an embodiment of the present invention.
Figure 9C:
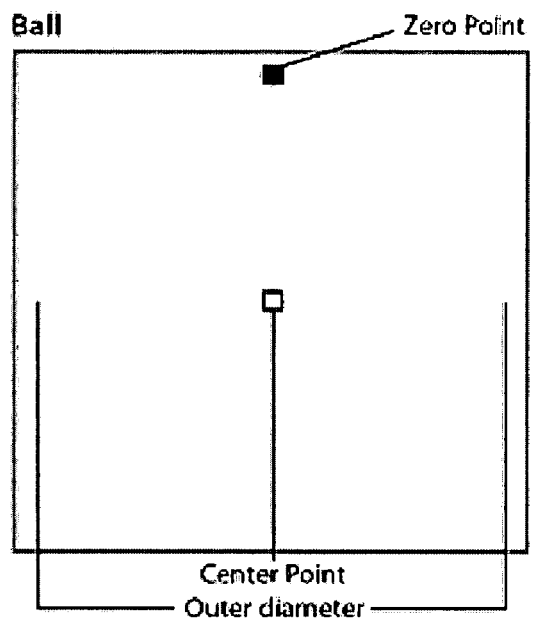
FIG. 9C depicts a rotate manipulator drawn as a ball according to an embodiment of the present invention.
Figure 9D:
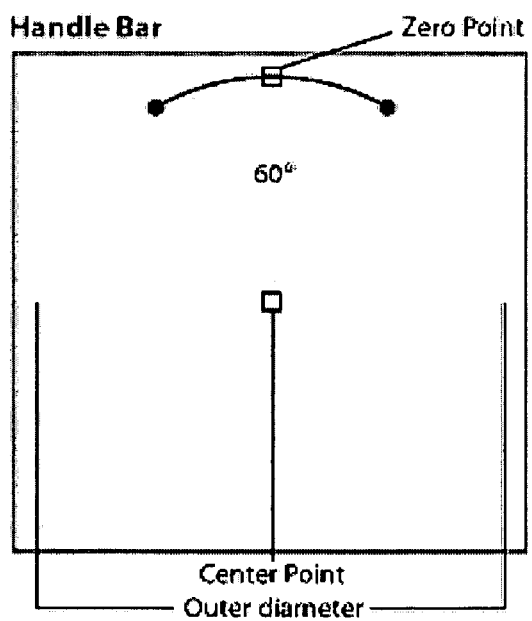
FIG. 9D depicts a rotate manipulator drawn as a handle bar according to an embodiment of the present invention.

As previously described, various draw styles may be set for manipulators of a widget including ring, half ring, stick, ball, handle bar, double stick, etc. FIGS. 9A, 9B, 9C, and 9D depict a rotate manipulator drawn using various basic default styles such as ring, stick, ball, and handle bar according to an embodiment of the present invention. For each manipulator style, a centre point, a zero point, and outer diameter of the manipulator are shown. FIG. 9A depicts a basic rotate manipulator drawn as a ring. FIG. 9B depicts a rotate manipulator drawn as a stick with a straight line drawn from the center point to the zero point. FIG. 9C depicts a rotate manipulator drawn as a ball having a sphere centered on the zero point. FIG. 9D depicts a rotate manipulator drawn as a handle bar. In the embodiment shown in FIG. 9D, a ring is culled down to 30 degrees on either side of the zero point, with diameter (e.g., 6 pixel diameter) spheres at either end point.

Figure 10:
FIG. 10 depicts a manipulator drawn as a half ring according to an embodiment of the present invention.

Manipulators may also be drawn using a half ring as depicted in FIG. 10. Half rings are culled from the viewer's perspective.

Figure 11:
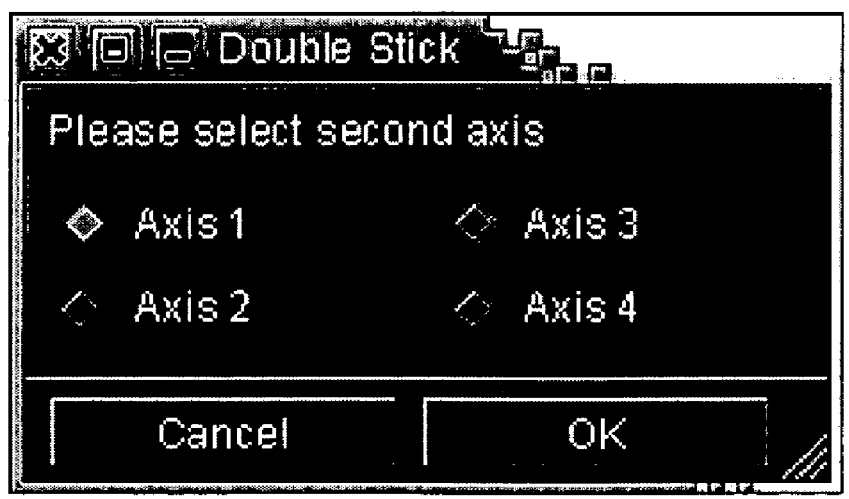
FIG. 11 depicts a dialog box used for defining a double stick drawing style according to an embodiment of the present invention.

A double stick drawing style is also provided which groups the control of two axes into a single double-axis stick manipulator. According to an embodiment of the present invention, to set up a double stick manipulator, a user may define a first manipulator (e.g., any single-axis rotate manipulator) by selecting the "double stick" option in the drawing style dropdown menu 225. A double stick dialog then appears (as depicted in FIG. 11), asking the user to specify the other manipulator for the double stick from a list of options. When the user chooses the second manipulator, its drawing style is reset to double stick. The user can apply additional drawing styles to the individual axes without affecting their membership in the double stick.

Figure 12A:
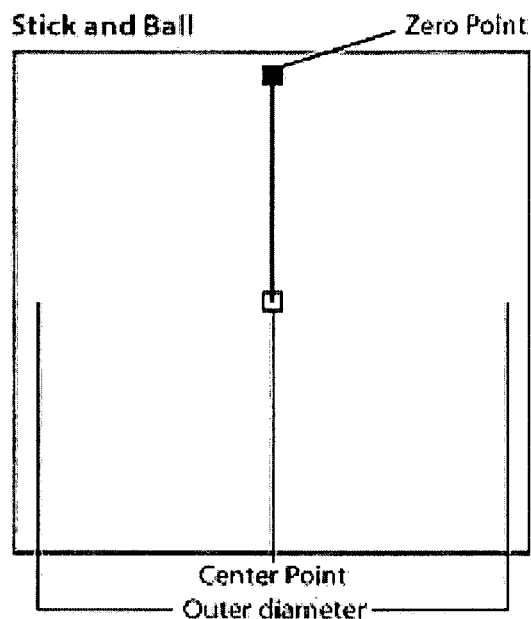
FIG. 12A depicts a rotate widget manipulator drawn according to a stick and ball style according to an embodiment of the present invention.
Figure 12B:
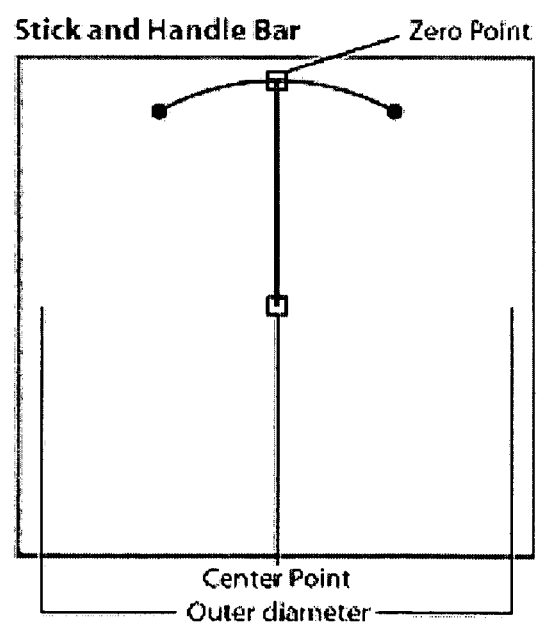
FIG. 12B depicts a rotate widget manipulator drawn according to a stick and handle bar style according to an embodiment of the present invention.
Figure 12C:
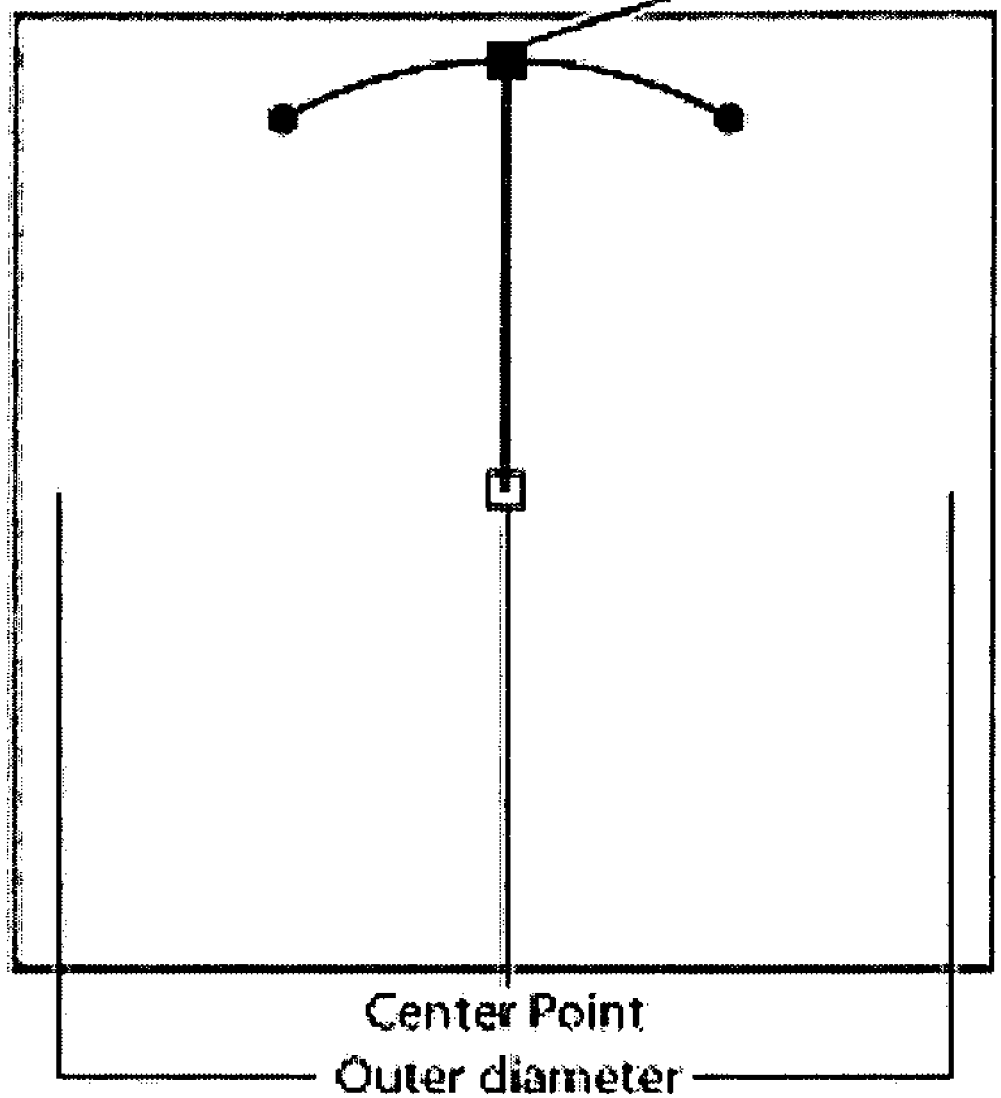
FIG. 12C depicts a rotate widget manipulator drawn according to a stick, ball, and handle bar style according to an embodiment of the present invention.

As previously described, manipulator drawing styles may be combined to create customized manipulator visual representations. FIG. 12A depicts a rotate widget manipulator drawn according to a stick and ball style. A straight line is drawn from the center point to the zero point (as in the stick style) and a sphere is centered on the zero point (ball style). FIG. 12B depicts a rotate widget manipulator drawn according to a stick and handle bar style. FIG. 12C depicts a rotate widget manipulator drawn according to a stick, ball, and handle bar style.

Various different drawing styles may be provided for different types of widgets and manipulators. For example, for a translate widget, the drawing styles for its manipulators may include a stick style, a stick and arrowhead styles, stick and cube style, and the like.

As described above, GUI 200 displays attributes associated with a widget (which includes attributes associated with manipulators of the widget) and their values. A user can modify or customizes the attribute value per the user's preferences or needs. The user can then save the modified settings as a new style (or update an existing style). According to an embodiment of the present invention, the style information is stored in a style file document. The stored style may then be applied to other widgets. The style may also be shared between multiple users, user groups, models, etc.

Figure 13:
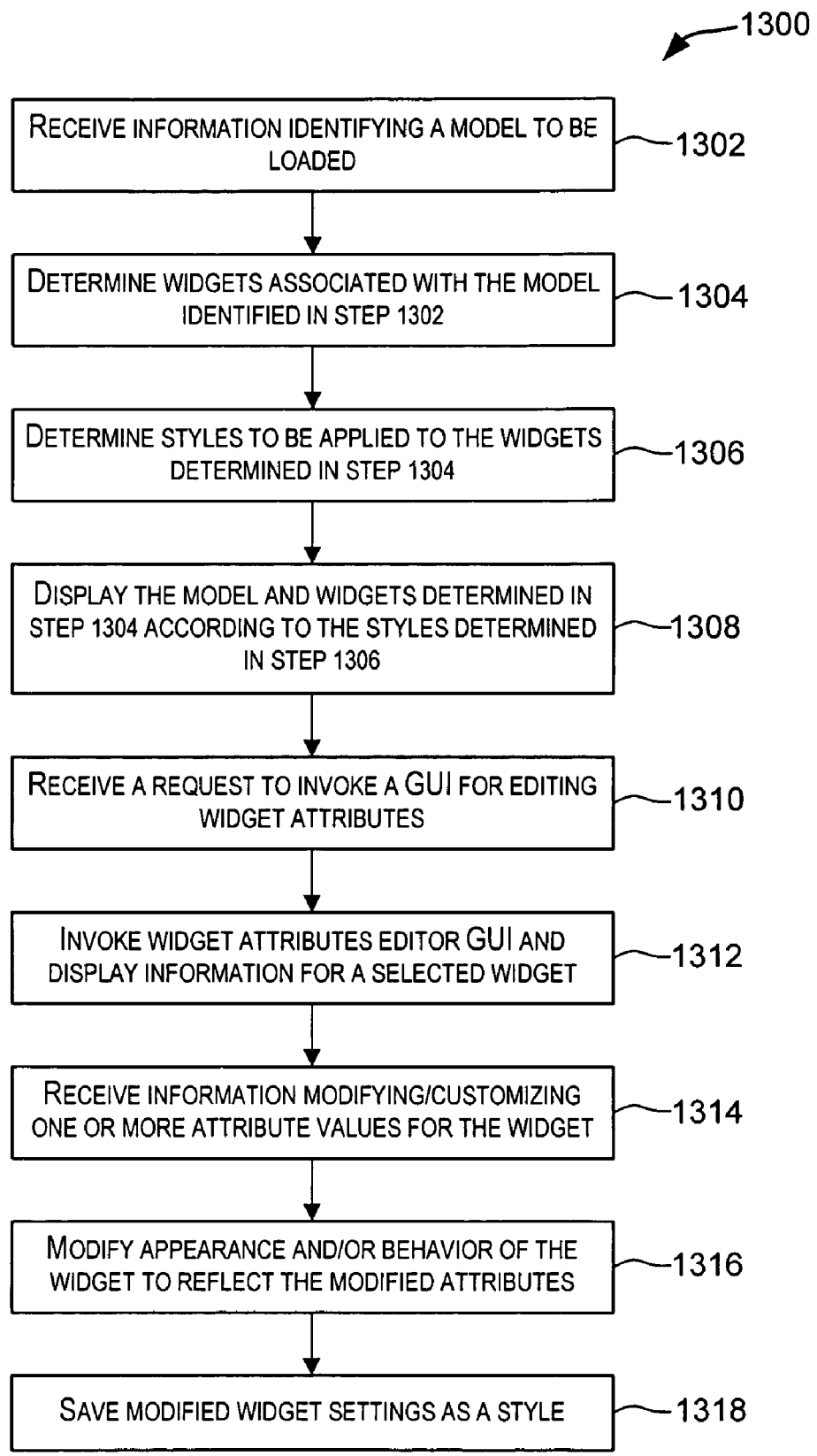
FIG. 13 is a simplified high-level flowchart depicting a method of using and customizing widget attributes according to an embodiment of the present invention.

FIG. 13 is a simplified high-level flowchart 1300 depicting a method of using and customizing widget attributes according to an embodiment of the present invention. The method depicted in FIG. 13 may be performed by software modules executed by a processor, hardware modules, or combinations thereof. Flowchart 1300 depicted in FIG. 13 is merely illustrative of an embodiment of the present invention and is not intended to limit the scope of the present invention. Other variations, modifications, and alternatives are also within the scope of the present invention. The method depicted in FIG. 13 may be adapted to work with different implementation constraints.

As depicted in FIG. 13, processing may be initiated upon receiving information indicating a model to be loaded (step 1302). One or more widgets associated with the model identified in step 1302 are then determined (step 1304). According to an embodiment of the present invention, information may be stored for each model identifying one or more widgets associated with the model. The widgets may have been associated with the model for example by a modeler.

Styles to be applied to the widgets determined in step 1304 are then determined (step 1306). The styles to be applied to a widget may be determined from various inputs. According to an embodiment of the present invention, a hierarchical approach may be used to determine which style is to be applied to a widget. If a customized style has been associated or defined with a widget then that customized style is determined in step 1306 to be applied to the widget. As previously stated, the customized style for a widget may be stored in a style file associated with the widget. In absence of a customized style, the model style, if any, defined for the model identified in step 1302 with which the widget is associated may be determined to be applied to the widget. The model style may have been configured for example by the modeler or other user. In the absence of a customized style or model style, the default style may be determined to be applied to the widget. The default style may have been configured by the widget designer, the modeler, or some other user. If no default or customized style or model style has been defined for the widget, then the style associated with a class of which the widget is an instance, may be determined for the widget in step 1306.

The model and the widgets are then displayed according to the styles determined in step 1306 (step 1308).

A request may then be received from the user to invoke a GUI for editing widget attributes (step 1310). A widget editor GUI is then invoked and information for a selected widget is displayed (step 1312). According to an embodiment of the present invention, GUI 200 depicted in FIG. 2 may be invoked in step 1312. The GUI may display information for a selected widget.

User input may then be received modifying or customizing one or more attribute values for the widget whose information is displayed in the widget editor GUI (step 1314). The one or more attribute values of the widget that are modified may include one or more values of attributes for manipulators of the widget. The appearance and/or behavior of the selected widget may be changed to reflect the modified attributes (step 1316).

The modifications to the widget may then be saved as a widget style (step 1318). If a customized widget style already exists for the widget, then the customized widget style may be updated to reflect and store the new modifications. Alternatively, the widget information including the modifications may be stored as a new widget style that is associated with the widget.

According to an embodiment of the present invention, the widget style information is stored as a text file. A "style" filename extension may be given to the file to identify it as a widget style file, for example, "rotateCustomized.style". The new or updated widget style file may be applied the next time that the widget is displayed. Once a widget style has been created, it may be applied to other widgets. The widget style can be applied to multiple widgets. For example, a user can identify a style file to be applied and the widgets to which the style file is to be applied and the style is then applied to the user-selected widgets.

A widget style created by a user can also be shared with other users. Accordingly, a user can use widget styles that belong to other users, productions, workgroups, etc.

Figure 14:
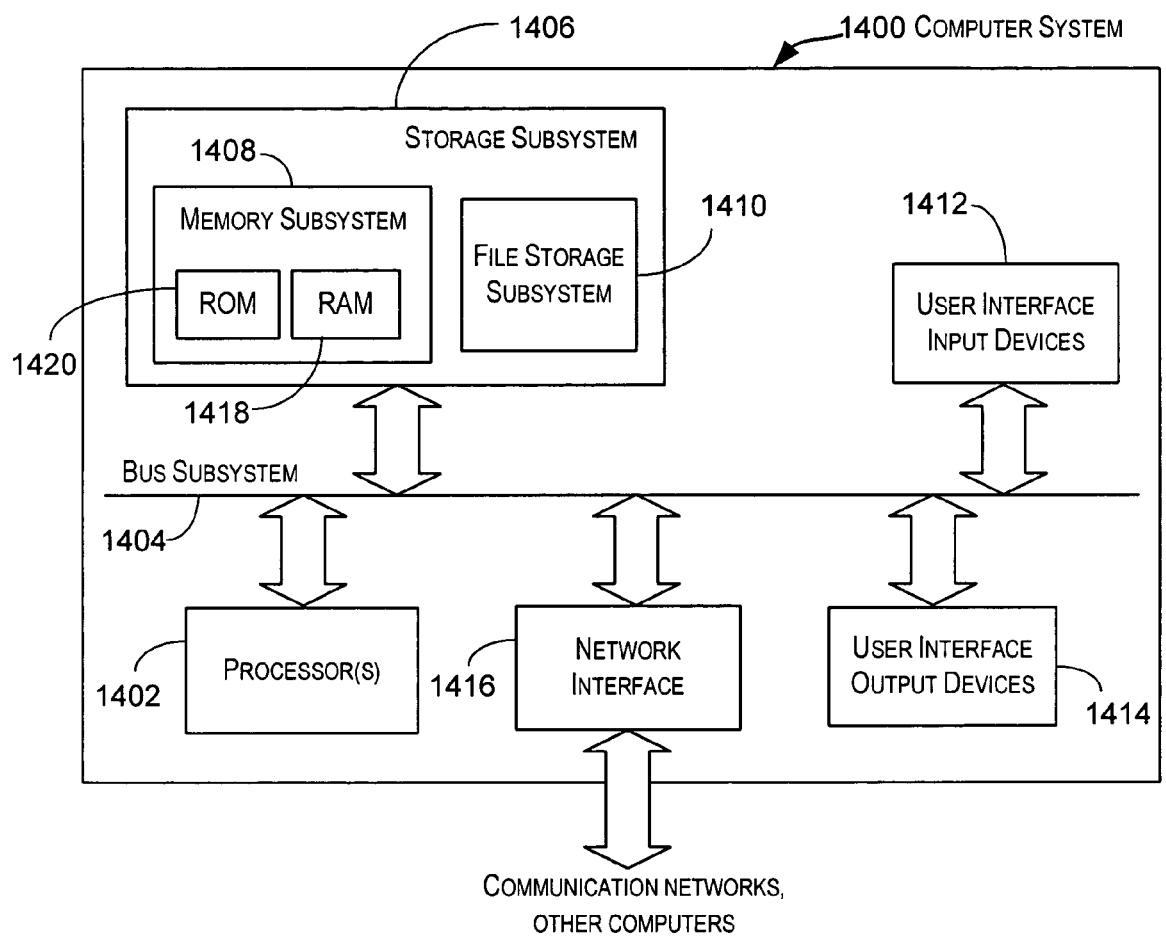
FIG. 14 is a simplified block diagram of a computer system that may be used to practice an embodiment of the present invention.

FIG. 14 is a simplified block diagram of a computer system 1400 that may be used to practice an embodiment of the present invention. As shown in FIG. 1, computer system 1400 includes a processor 1402 that communicates with a number of peripheral devices via a bus subsystem 1404. These peripheral devices may include a storage subsystem 1406, comprising a memory subsystem 1408 and a file storage subsystem 1410, user interface input devices 1412, user interface output devices 1414, and a network interface subsystem 1416. The input and output devices allow a user, such as the administrator, to interact with computer system 1400.

Network interface subsystem 1416 provides an interface to other computer systems, and networks. Network interface subsystem 1416 serves as an interface for receiving data from other sources and for transmitting data to other sources from computer system 1400. Embodiments of network interface subsystem 1416 include an Ethernet card, a modem (telephone, satellite, cable, ISDN, etc.), (asynchronous) digital subscriber line (DSL) units, and the like.

User interface input devices 1412 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 1400.

User interface output devices 1414 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 1400.

Storage subsystem 1406 may be configured to store the basic programming and data constructs that provide the functionality of the present invention. For example, according to an embodiment of the present invention, software code modules implementing the functionality of the present invention may be stored in storage subsystem 1406. These software modules may be executed by processor(s) 1402. Storage subsystem 1406 may also provide a repository for storing data used in accordance with the present invention. For example, style files may be stored in storage subsystem 1406. Storage subsystem 1406 may comprise memory subsystem 1408 and file/disk storage subsystem 1410.

Memory subsystem 1408 may include a number of memories including a main random access memory (RAM) 1418 for storage of instructions and data during program execution and a read only memory (ROM) 1420 in which fixed instructions are stored. File storage subsystem 1410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1404 provides a mechanism for letting the various components and subsystems of computer system 1400 communicate with each other as intended. Although bus subsystem 1404 is shown schematically as a single bus, alternative embodiments of the bus subsystem may utilize multiple busses.

Computer system 1400 can be of various types including a personal computer, a portable computer, a workstation, a network computer, a mainframe, a kiosk, or any other data processing system. Due to the ever-changing nature of computers and networks, the description of computer system 1400 depicted in FIG. 14 is intended only as a specific example for purposes of illustrating the preferred embodiment of the computer system. Many other configurations having more or fewer components than the system depicted in FIG. 14 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of storing visual style information for a widget associated with a 3-dimensional geometric object, the method comprising:

receiving information identifying a first widget associated with a 3-dimensional geometric object, the first widget having a set of controls associated with manipulation of the 3-dimensional geometric object;

determining a set of attributes for the set of controls associated with manipulation of the 3-dimentional object and values associated with the set of attributes, the set of attributes comprising a first attribute having an associated first value;

receiving input indicative of a change in the value associated with the first attribute from the first value to a second value distinct from the first value; and storing style information, in a file storage subsystem, that visually distinguishes operation of a widget, the style information comprising information related to the set of attributes for the set of controls and their associated values, wherein the style information comprises information associating the second value with the first attribute.

2. The method of claim 1 wherein:
the first widget comprises a manipulator; and
the first attribute is associated with the manipulator.

3. The method of claim 1:
further comprising displaying the set of attributes for the set of controls of the first widget and values associated with the set of attributes in a graphical user interface;
wherein receiving the input comprises receiving the input via the graphical user interface; and
wherein storing the style information comprises receiving, via the graphical user interface, a request to save the set of attributes and their associated values for the first widget.

4. The method of claim 1 further comprising displaying the first widget according to the style information based on the set of attributes and their associated values.

5. The method of claim 1 wherein determining the set of attributes for the set of controls of the first widget comprises determining a first file associated with the first widget, the first file storing information identifying the set of attributes and associated values.

6. The method of claim 5 wherein storing the style information comprises storing the style information in a second file distinct from the first file.

7. The method of claim 1 further comprising:
receiving information identifying a second widget; and
applying the style information to the second widget.

8. The method of claim 1 wherein the input is received from a first user, the method further comprising enabling use of the style information by one or more users other than the first user.

9. The method of claim 1 wherein storing the style information comprises:
receiving a request from a user to save the set of attributes and their associated values for the set of controls of the first widget;
determining whether the user is allowed to save the set of attributes and their associated values for the first widget; and
storing the style information only if it is determined that the user is allowed to save the set of attributes and their associated values for the first widget.

10. A computer program product stored on a computer-readable medium for storing visual style information for a widget associated with a 3-dimensional geometric object, the computer program product comprising:
code for receiving information identifying a first widget associated with a 3-dimensional geometric object, the first widget having a set of controls associated with manipulation of the 3-dimensional geometric object;
code for determining a set of attributes for the set of controls associated with manipulation of the 3-dimensional geometric object and values associated with the set of attributes, the set of attributes comprising a first attribute having an associated first value;
code for receiving input indicative of a change in the value associated with the first attribute from the first value to a second value distinct from the first value; and
code for storing style information that visually distinguishes operation of a widget, the style information comprising information related to the set of attributes for the set of controls and their associated values, wherein the style information comprises information associating the second value with the first attribute.

11. The computer program product of claim 10 wherein the first widget comprises a manipulator and the first attribute is associated with the manipulator.

12. The computer program product of claim 10:
further comprising code for displaying the set of attributes for the set of controls of the first widget and values associated with the set of attributes in a graphical user interface,
wherein the code for receiving the input comprises code for receiving the input via the graphical user interface; and
wherein the code for storing the style information comprises code for receiving, via the graphical user interface, a request to save the set of attributes and their associated values for the first widget.

13. The computer program product of claim 10 further comprising code for displaying the first widget according to the style information based on the set of attributes and their associated values.

14. The computer program product of claim 10 wherein the code for determining the set of attributes for the set of controls of the first widget comprises code for determining a first file associated with the widget, the first file storing information identifying the set of attributes and associated values.

15. The computer program product of claim 14 wherein the code for storing the style information comprises code for storing the style information in a second file distinct from the first file.

16. The computer program product of claim 10 further comprising:
code for receiving information identifying a second widget; and
code for applying the style information to the second widget.

17. The computer program product of claim 10 wherein the input is received from a first user, the computer program product further comprising code for enabling use of the style information by one or more users other than the first user.

18. The computer program product of claim 10 wherein the code for storing the style information comprises:
code for receiving a request from a user to save the set of attributes and their associated values for the first widget;
code for determining whether the user is allowed to save the set of attributes and their associated values for the first widget; and
code for storing the style information only if it is determined that the user is allowed to save the set of attributes and their associated values for the set of controls of the first widget.

19. A data processing system comprising:
a processor; and
a memory coupled to the processor, the memory configured to store a plurality of code modules which when executed by the processor cause the processor to:
receive information identifying a first widget associated with a 3-dimensional geometric object, the first widget having a set of controls associated with manipulation of the 3-dimensional geometric object;
determine a set of attributes for the set of controls associated manipulation of the 3-dimensional object and values associated with the set of attributes, the set of attributes comprising a first attribute having an associated first value;
receive input indicative of a change in the value associated with the first attribute from the first value to a second value distinct from the first value; and store style information that visually distinguishes operation of a widget, the style information comprising information related to the set of attributes for the set of controls and their associated values, wherein the style information comprises information associating the second value with the first attribute.

20. An apparatus for storing information for a widget associated with a 3-dimensional geometric object, the apparatus comprising:

means for receiving information identifying a first widget associated with a 3-dimensional geometric object, the first widget having a set of controls associated with manipulation of the 3-dimensional geometric object;

means for determining a set of attributes for the set of controls associated with manipulation of the 3-dimensional object and values associated with the set of attributes, the set of attributes comprising a first attribute having an associated first value;

means for receiving input indicative of a change in the value associated with the first attribute from the first value to a second value distinct from the first value; and means for storing style information that visually distinguishes operation of a widget, the style information comprising information related to the set of attributes and their associated values, wherein the style information comprises information associating the second value with the first attribute.

* * * * *